United States Patent
Haddad et al.

(10) Patent No.: US 9,136,722 B2
(45) Date of Patent: Sep. 15, 2015

(54) USB DEVICE CHARGER FOR USE WITH ELECTRIC POWERED WHEELCHAIRS AND SCOOTERS

(71) Applicants: Joseph Wayne Haddad, San Antonio, TX (US); Augustine Marquez Pena, San Antonio, TX (US)

(72) Inventors: Joseph Wayne Haddad, San Antonio, TX (US); Augustine Marquez Pena, San Antonio, TX (US)

( * ) Notice: Subject to any disclaimer, the term of this patent is extended or adjusted under 35 U.S.C. 154(b) by 383 days.

(21) Appl. No.: 13/677,174

(22) Filed: Nov. 14, 2012

(65) Prior Publication Data
US 2013/0314029 A1 Nov. 28, 2013

Related U.S. Application Data

(60) Provisional application No. 61/559,238, filed on Nov. 14, 2011.

(51) Int. Cl.
*H01M 10/46* (2006.01)
*H02J 7/00* (2006.01)

(52) U.S. Cl.
CPC .............. *H02J 7/0054* (2013.01); *H02J 7/0047* (2013.01); *H02J 2007/0062* (2013.01)

(58) Field of Classification Search
CPC ......... H02J 7/042; H02J 7/045; H02J 7/0026; H02J 7/0029
USPC ........................ 320/107, 111, 114, 115, 104
See application file for complete search history.

(56) References Cited

PUBLICATIONS

Wheelchair Driver, "How to Fit a USB Charge Socket to a Powerchair Easily," 1997. 6 pages. www.wheelchairdriver.com/usb-powerchair-charge-port.html.*
Monster Scooter Parts, "USB Charging Adapter for Scooters and Power Chairs (Alvey)," no date. 2 pages. www.monsterscooterparts.com/xlr-usb-charger.html.*
Monster Scooter Parts, "Hey, Why Didn't I Think of That!" Jun. 18, 2012. 2 pages. www.monsterscooterparts.blogspot.com/2012/06/hey-why-didnt-i-think-of-that.html.*

* cited by examiner

*Primary Examiner* — Edward Tso
(74) *Attorney, Agent, or Firm* — Kammer Browning PLLC

(57) ABSTRACT

An interconnect device for connecting the charging system of an electric wheelchair with the charging system of at least one portable electronic device through a USB cable to charge the portable device from the stored electric charge within the electric wheelchair battery system. The interconnect device includes an XLR type connector for connecting to the standard XLR type connector found on most electrical wheelchairs and scooters. The XLR connector is structured into a circuit housing or connected to the circuit housing through a short length of cable. The circuit housing holds the circuit electronics for the device. One or more USB jacks are provided to which standard USB cables may be connected. The interconnect circuitry includes a fuse or circuit breaker, as well as one or more step down voltage regulators and one or more voltage divider circuits. LED indicators show the charging status of a particular USB jack.

11 Claims, 3 Drawing Sheets

USB DEVICE CHARGER FOR USE WITH ELECTRIC POWERED WHEELCHAIRS AND SCOOTERS

CROSS REFERENCES TO RELATED APPLICATIONS

This application claims the benefit under Title 35 United States Code §119(e) of U.S. Provisional Patent Application Ser. No. 61/559,238; filed: Nov. 14, 2011, the full disclosure of which is incorporated herein by reference.

BACKGROUND OF THE INVENTION

1. Field of the Invention

The present invention relates generally to systems and devices for charging or recharging portable electronic devices. The present invention relates more specifically to interconnect devices appropriate for connecting and charging portable electronic devices from the electrical system associated with an electric powered wheelchair or the like.

2. Description of the Related Art

Many individuals that must regularly or occasionally utilize wheelchairs or scooters and the like, carry and use personal electronic devices in the nature of cell phones, smart phones, PDA devices, MP3 players, GPS devices, tablet computers, etc. The vast majority of these devices are battery powered with the batteries in the device being charged and recharged through an external cable connector extending to the device from a power source. The majority of cell phone and smart phone type devices utilize a standardized USB cable to connect the portable device to a power source. Although the various portable devices might utilize proprietary connectors, most utilize USB cables with USB connectors at the distal end of the charging cable so that the device may be alternately connected to a car charger (DC/DC) system or to a wall outlet (AC/DC) charger system. In this manner, many different types of portable electronic devices may be charged through the same standard USB cable. Currently, such USB charging systems are limited to a standard 110 VAC or 220 VAC wall outlet charging device, or to a 12 VDC automotive charging device. Such wall chargers and car chargers that utilize USB cables are well known.

Wheelchairs may take the form of manually operated or electrically operated. Electric wheelchairs and electric scooters are quite common, and have become the preferred mode of transportation for those that must utilize wheelchairs, even on an occasional basis. Most electric wheelchairs and scooters operate on an electric motor drive that derives its power from a re-chargeable battery system. Most electric wheelchairs and scooters utilize a charging system that connects the wheelchair to a power source through a standardized XLR type three pin connector. Under normal operation, the wheelchair user connects an external power source, typically a connection to a 110 or 220 volts electrical AC outlet that steps the voltage down to the 10-34 volts required for charging the re-chargeable battery system of the wheelchair. (Note: References to "wheelchairs" in the present application will be understood to include not only electric wheelchairs but other electric chairs, scooters, and wheeled seated transportation devices designed for individual use.)

Once an electric wheelchair is fully charged from an external power source, the re-chargeable battery system on the wheelchair retains a relatively significant charge capable of operating the drive system in the wheelchair for some period of time. The quantity of the charge and the current capable of being generated (the electrical power output) is relatively high for such electrical/electronic devices. The electrical systems typically found on wheelchairs must operate at such a relatively high power level because of the work that is required to transport the individual use over at least a typical day's movement, if not longer. In contrast, most personal portable electronic devices operate on relatively very low power consumption and as such the charge retained within the portable electronic device is relatively small. Likewise, the amount of electrical charge required to fully charge a portable electronic device is generally small in comparison to that required for an electric wheelchair. The respective sizes of the rechargeable batteries is a good indication of this difference.

It would be desirable therefore to be able to utilize a portion of the stored electric charge in an electric wheelchair to directly charge a portable personal electronic device. It would be desirable if such a transfer of electric charge could occur through existing charging systems for both the wheelchair and the personal portable electronic device. It would be desirable to have an interconnect device that was capable of drawing electric charge from a charged electric wheelchair system and directing it into a portable electronic device at a controlled rate and at suitable current and voltage levels. It would be desirable if such an interconnect device could be used by an individual in a wheelchair to easily charge their personal portable electronic devices such as cell phones, tablet computers, MP3 players, cameras, GPS devices, and so on.

SUMMARY OF THE INVENTION

The present invention therefore provides an interconnect device suitable for placement between the charging system of an electric wheelchair and the charging system of a portable electronic device through a standard USB cable to allow the user of the portable electronic device to charge the device from the stored electric charge within the electric wheelchair re-chargeable battery system. The interconnect device includes an XLR type standard male connector for connecting to the XLR type standard female connector found on most electrical wheelchairs and scooters. The XLR male connector is directly structured on an interconnect device circuit housing or connected to the circuit housing through a short length of cable. The circuit housing holds the circuit electronics associated with the interconnect device. The circuit housing provides one or more USB connector jacks to which standard USB cables may be connected. Internally, the interconnect circuitry includes a fuse or fuseable link, as well as one or more step down voltage regulators and one or more voltage divider circuits, which connect to the output USB jacks. LED indicators are also provided display the charging status of the particular USB jack on the interconnect device. Various structural configurations for the interconnect device circuitry housing are anticipated.

DETAILED DESCRIPTION OF THE PREFERRED EMBODIMENTS

Figure 1:
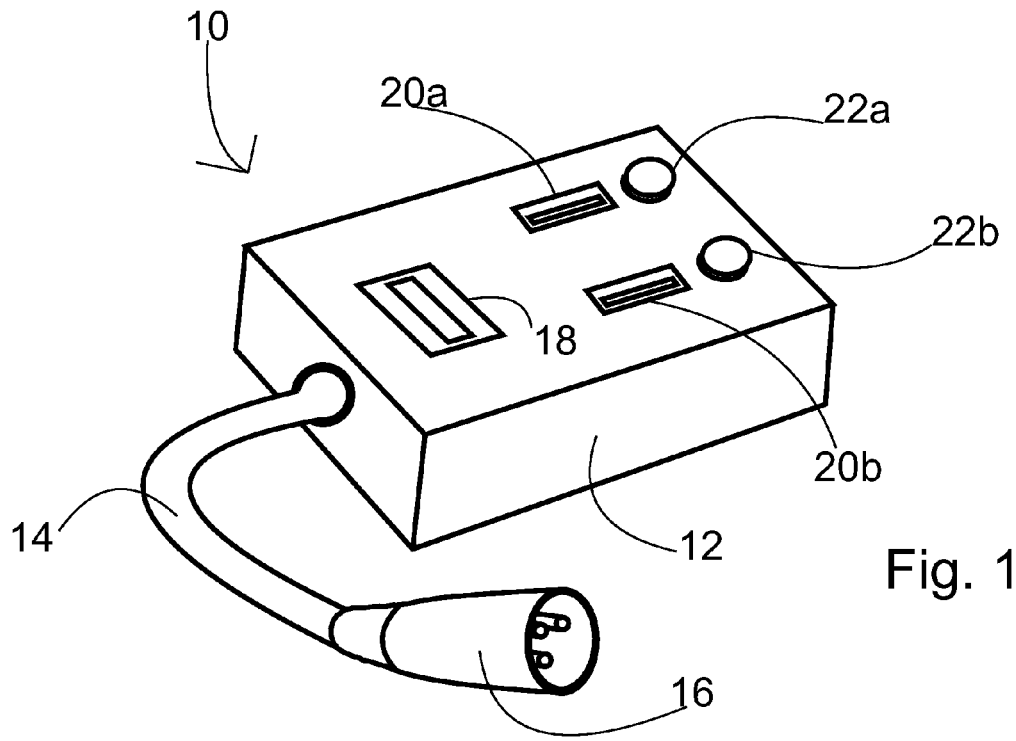
FIG. 1 is a perspective view of a first preferred embodiment of the interconnect device of the present invention showing the input cabling and the output USB jacks.

Reference is made first to FIG. 1 for a description of a first preferred embodiment of the present invention that provides an interconnect module appropriate for charging personal portable electronic devices directly from the re-chargeable battery system of a typical electrical wheelchair or scooter. In FIG. 1, interconnect device 10 is shown to be made of circuit housing 12 which connects through an input power cable 14 to XLR male connector 16. Connector 16 is the standard XLR type male connector suitable for connection to the normal XLR type female connector charging input associated with most electric wheelchairs. When used in the normal wheelchair charging function manner, the male XLR connector directs a charging current into the wheelchair re-chargeable battery system as opposed to drawing a charging current out, as in the present invention. The nature of the charging circuitry associated with most electric wheelchairs is such that the necessary voltage is provided for to achieve an output flow of current through the same XLR connector system.

Circuit housing 12 as shown in FIG. 1 includes removable replaceable fuse 18, as well as one or more USB jacks 20a & 20b. Associated with each of the USB jacks 20a & 20b are LED indicators 22a & 22b. Those skilled in the art will recognize that one or more USB jacks may be utilized in conjunction with any given embodiment of the present invention. Most user needs are satisfied by having two USB ports for power charging purposes, although three or four may also be practical for some users.

Figure 2:
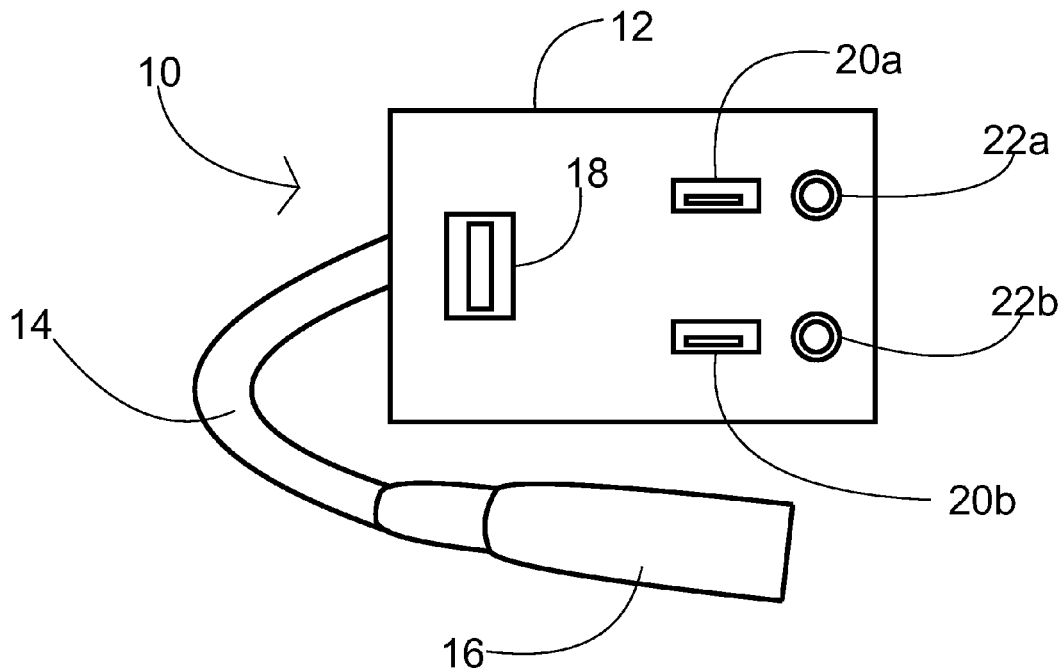
FIG. 2 is a top plan view of the first preferred embodiment of the present invention as shown in FIG. 1.

FIG. 2 is a top plan view of the interconnect device 10 shown and described in FIG. 1. In this view, the user is presented with easily accessible USB ports 20a & 20b and likewise may easily view the LED indicators 22a & 22b. Fuse 18 is also readily accessible for reset or replacement if for some reason the charging current exceeds the tolerance of the electronic circuitry. In most cases, the output voltage and current that can be derived from standard wheelchair rechargeable battery circuits is easily handled by the electronic circuitry of the present invention, given the appropriate voltage regulators and transformers within the circuitry. Fuse 18 does, however, further protect the device against over current connections that might inadvertently occur with any of a wide variety of wheelchair rechargeable battery systems.

Figure 3:
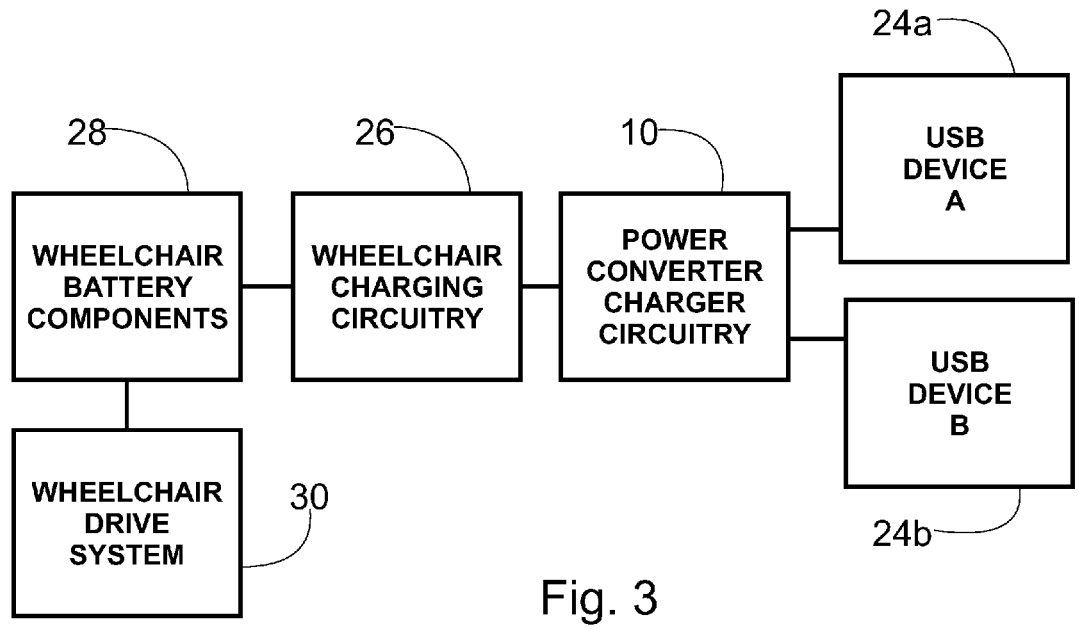
FIG. 3 is a schematic block diagram showing the various external components that are connected together in conjunction with the interconnect device of the present invention to achieve a charging circuit for portable electronic devices.

Reference is next made to FIG. 3 for an overview of the manner in which device 10 of the present invention is connected to both the wheelchair rechargeable battery system and the portable electronic devices being recharged. In FIG. 3, interconnect device 10 is shown to connect to USB device 24a as well as USB device 24b. Once again, more than two such devices may be connected if the interconnect device of the present invention is provided with more than two USB jacks. The circuitry of the interconnect power converter charger device 10 of the present invention receives an input charging current from wheelchair charging circuitry 26 through the XLR connectors as described above. Wheelchair charging circuitry 26 typically comprises electronic interface circuitry directing an electrical charge from the external charging source (not shown) to wheelchair battery components 28. The re-chargeable battery components 28 are of course connected to the wheelchair drive system 30 that actually powers and moves the wheelchair.

Figure 4:
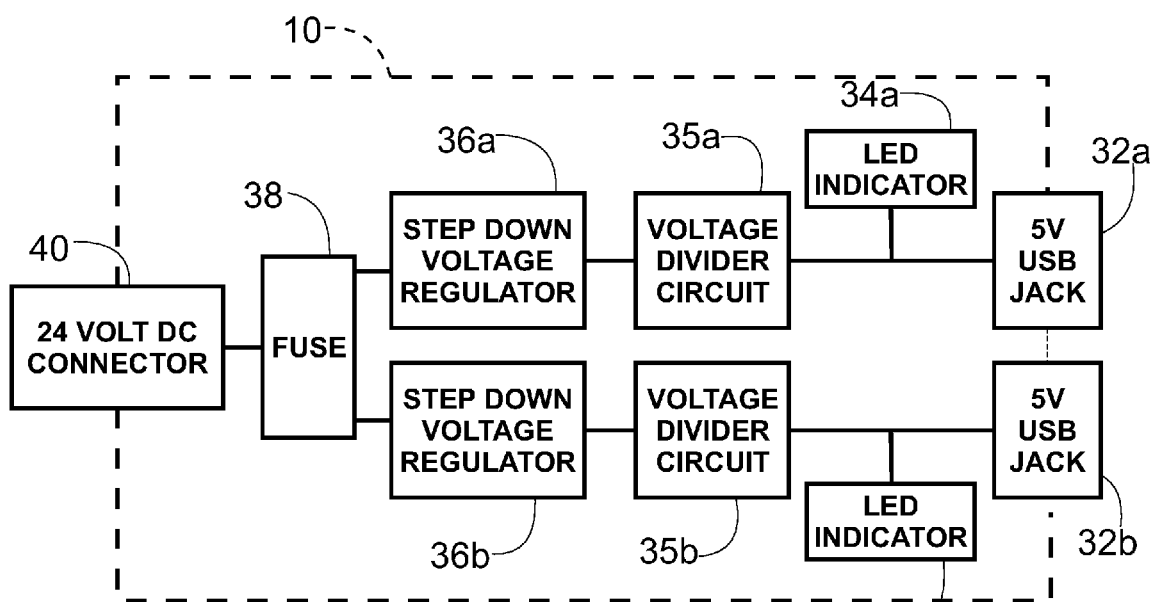
FIG. 4 is a detailed schematic block diagram showing the basic electronic circuit elements associated with the interconnect power converter charger device of the present invention.

FIG. 4 provides greater detail on the electronic circuitry of the present invention, showing the basic circuit elements of the circuitry of the power converter charger device 10. The 24-volt DC connector 40 is the XLR male connector as described above in the preferred embodiment. Fuse or circuit breaker 38 protects against an over-current condition and isolates the input charging source from the internal electronic circuitry within the device 10.

Each charging path in the present invention (two in the primary examples given herein and in FIG. 4) will have the appropriate circuit elements necessary to produce an output of 5 VDC at a suitable charging current through the USB jack or jacks on the device. In FIG. 4, step-down voltage regulators 36a & 36b are shown to connect through the fuse 38 to the incoming electric charge source at connector 40. After the step-down voltage regulator components 36a & 36b, voltage divider circuits 35a & 35b are provided, which in turn present a 5 VDC, 2.1 A (as an example) charging current to output USB jacks 32a & 32b. LED indicators 34a & 34b are associated with each of the USB charging circuits and indicate when a device is connected and is appropriately charging through the circuit.

Figure 5:
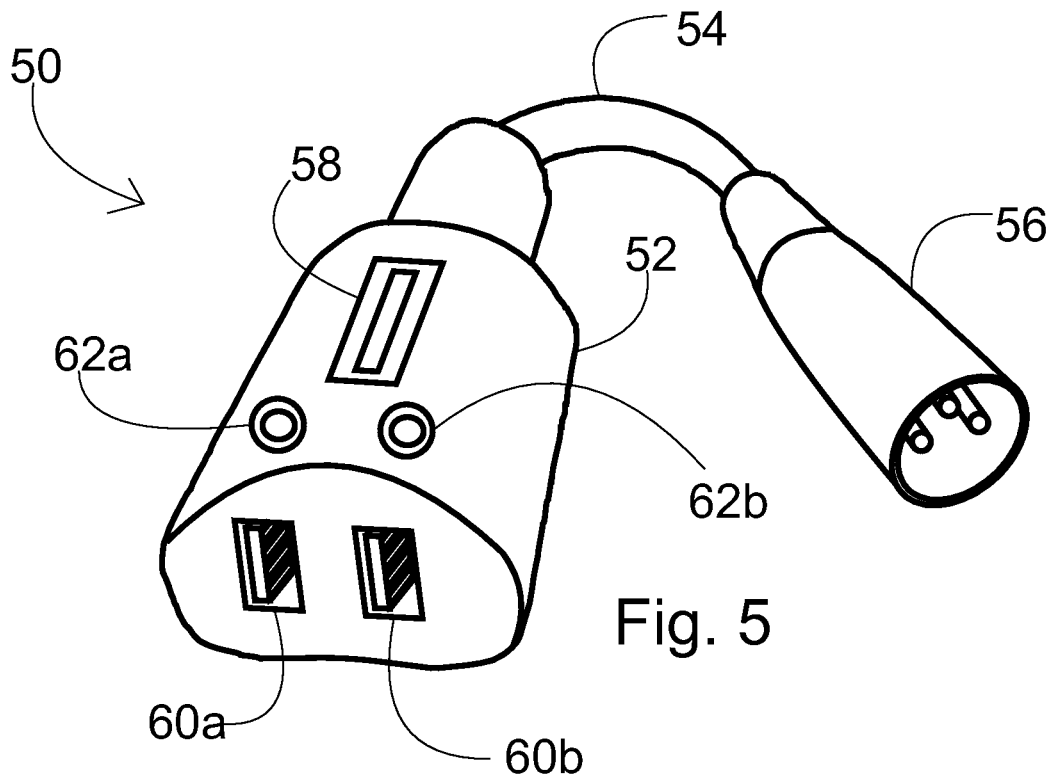
FIG. 5 is a perspective view of a second configuration embodiment of the present invention wherein USB jacks are presented as inline connections, as in the nature of an electrical extension cord type orientation.
Figure 6:
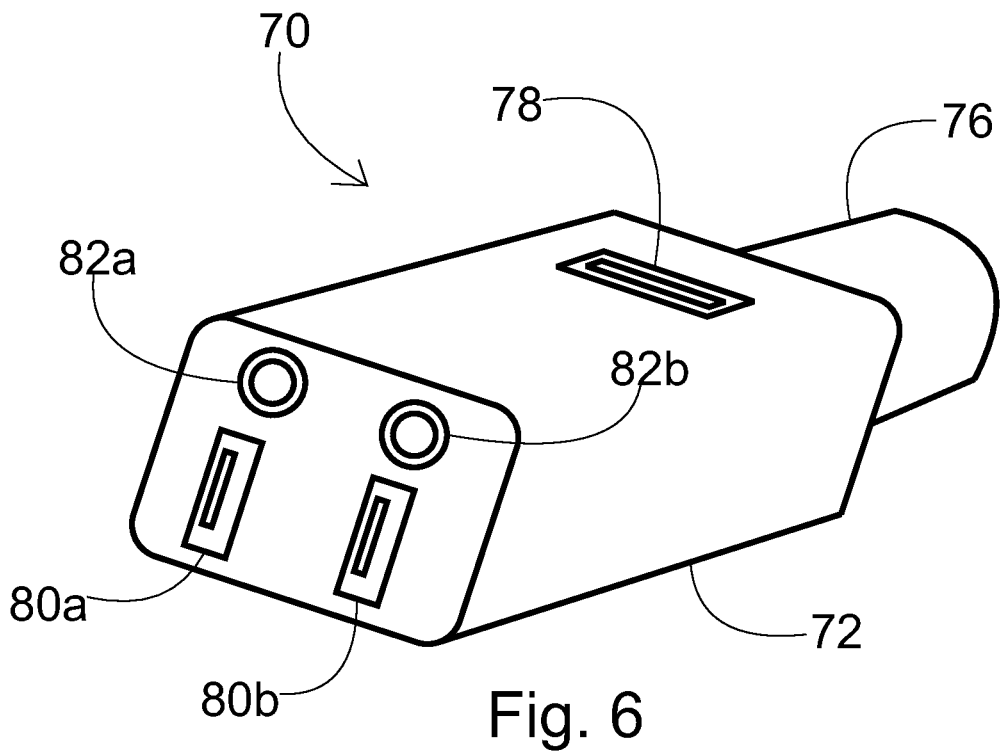
FIG. 6 is a perspective view of a third configuration embodiment of the present invention wherein the XLR type connector is incorporated into the circuitry housing.

Reference is finally made to FIGS. 5 & 6 which present different structural outward configurations for the device of the present invention, albeit, that the internal structures of the devices, including the circuit elements, remain essentially the same. In FIG. 5, interconnect charging device 50 is shown to comprise circuit housing 52 connected by way of charging cable 54 to XLR connector 56. A replaceable fuse 58 is shown positioned in circuit housing 52. USB output jacks 60a & 60b are shown at one end face of housing 52 for convenient access. LED power indicators 62a & 62b are positioned in association with USB output jacks 60a & 60b, again so as to be easily viewed by the user during use.

FIG. 6 shows interconnect device 70 which essentially removes the length of interconnect cable 54 (shown in FIG. 5) between the circuit enclosure 72 and the XLR connector 76. In this manner, the interconnect device 70 may be simply inserted into the female XLR socket on the typical electric wheelchair and one or more USB cables may be connected thereto. A removable fuse 78 is likewise provided within the circuit enclosure 72. USB jacks 80a & 80b are provided at an easily accessible end face of the device, as are LED power indicators 82a & 82b.

Although the present invention has been described in conjunction with certain preferred embodiments, those skilled in the art will recognize that certain modifications as to the external appearance of these embodiments might be made without departing from the spirit and scope of the invention. In general, the device of the present invention is structured to interface between the standard connectors (XLR type connectors) utilized in conjunction with wheelchair charging systems, and standard connectors (USB connectors) typically utilized in conjunction with portable electrical devices systems. Variations on the manner in which the two different electrical systems are connected are anticipated with some of these variations based on the specific portable electronic device being charged. It is known, for example, to have a variety of adaptors for connecting standard USB cables to various proprietary input connectors on the wide variety of portable electronic devices that are available. Those skilled in the art will recognize that the standard USB connector is one consistent element in the interconnect device of the present invention simply because of its widespread use. Various modifications of the internal circuitry associated with the device of the present invention are also anticipated to reflect variations in the input voltages and currents received from the wheelchair re-chargeable battery system. Also, as indicated above, the number of USB charging circuits may vary according to the size of the interconnect device desired and the number of portable devices to be charged.

We claim:

1. An electrical/electronic interconnect device for charging portable electronic devices that utilize standard USB connections for charging, from an electric powered wheelchair re-chargeable battery system, the wheelchair re-chargeable battery system having a standard XLR female connector charging port, the interconnect device comprising:

a standard XLR male connector, connectable to the charging port of the wheelchair re-chargeable battery system; and an electronic charging circuitry module connected to the standard XLR male connector, the standard XLR male connector configured as an input to the electronic charging circuitry module, the electronic charging circuitry module comprising:

at least one step-down voltage regulator circuit having an input and an output, the at least one voltage regulator circuit receiving an input voltage from the wheelchair re-chargeable battery system through the standard XLR male and female connectors, and providing a regulated voltage at the output of the at least one voltage regulator circuit;

at least one voltage divider circuit having an input and an output, the at least one voltage divider circuit receiving an input voltage from the at least one voltage regulator circuit and providing a lower output voltage at the output of the at least one voltage divider circuit; and at least one output USB jack connected to the output of the at least one voltage divider circuit, the output USB jack providing a point of connection for charging the portable electronic devices.

2. The interconnect device of claim 1 further comprising a length of multiconductor cable connecting the XLR male connector to the electronic charging circuitry module.

3. The interconnect device of claim 1 further comprising at least one LED indicator connected to the output of the at least one voltage divider circuit to indicate a charging condition through at least a portion of the electronic charging circuitry module.

4. The interconnect device of claim 1 further comprising at least one fuse circuit configured within the electronic charging circuitry module between the standard XLR male connector and the at least one step-down voltage regulator circuit.

5. The interconnect device of claim 4 wherein the at least one fuse circuit comprises a removable and replaceable fuse component.

6. The interconnect device of claim 1 further comprising at least one resettable circuit breaker configured within the electronic charging circuitry module between the standard XLR male connector and the at least one step-down voltage regulator circuit.

7. The interconnect device of claim 1 wherein the electronic charging circuitry module further comprises a unitary enclosure and the standard XLR male connector comprises a rigid extension of the unitary enclosure.

8. The interconnect device of claim 1 wherein:

the at least one step-down voltage regulator circuit comprises two step-down voltage regulator circuits;

the at least one voltage divider circuit comprises two voltage divider circuits; and the at least one output USB jack comprises two output USB jacks.

9. The interconnect device of claim 8 further comprising two LED indicators, each LED indicator connected to the output of one of the two voltage divider circuits to indicate a charging condition through one of the two output USB jacks.

10. The interconnect device of claim 1 wherein an input voltage through the standard XLR male connector into the electronic charging circuitry module comprises a nominal 24 VDC and an output voltage from the at least one output USB jack comprises a nominal 5 VDC.

11. An electrical/electronic interconnect device for charging portable electronic devices that utilize standard USB connections for charging, from an electric powered wheelchair re-chargeable battery system, the wheelchair re-chargeable battery system having a standard XLR female connector charging port, the interconnect device comprising:

a standard XLR male connector, connectable to the charging port of the wheelchair re-chargeable battery system; and an electronic charging circuitry module connected to the standard XLR male connector, the standard XLR male connector configured as an input to the electronic charging circuitry module, the electronic charging circuitry module comprising:

at least one fuse circuit configured on the input to the electronic charging circuitry module;

at least one step-down voltage regulator circuit having an input and an output, the at least one voltage regulator circuit connected to the at least one fuse circuit and receiving an input voltage from the wheelchair re-chargeable battery system through the standard XLR male and female connectors, and providing a regulated voltage at the output of the at least one voltage regulator circuit;

at least one voltage divider circuit having an input and an output, the at least one voltage divider circuit receiving an input voltage from the at least one voltage regulator circuit and providing a lower output voltage at the output of the at least one voltage divider circuit;

at least one LED indicator connected to the output of the at least one voltage divider circuit to indicate a charging condition through at least a portion of the electronic charging circuitry module; and at least one output USB jack connected to the output of the at least one voltage divider circuit, the output USB jack providing a point of connection for charging the portable electronic devices.

* * * * *